Jan. 8, 1946.  C. F. J. SMITH ET AL  2,392,557

MECHANICAL RAMP LOADING DEVICE

Filed Dec. 15, 1943

Inventors
C. F. J. Smith
L. R. Bottom
By Glascock Downing Archbold
Attys

Patented Jan. 8, 1946

2,392,557

UNITED STATES PATENT OFFICE 2,392,557

MECHANICAL RAMP LOADING DEVICE

Charles F. J. Smith and Leonard R. Bottom, Broken Hill, New South Wales, Australia Application December 15, 1943, Serial No. 514,402
In Australia August 13, 1943

5 Claims. (Cl. 214—103)

This invention relates to a ramp loading device whereby goods can be placed on to a truck or unloaded therefrom or raised into position for storage.

A familiar device at present is a ramp skid made of logs inclinably arranged behind the object to receive the goods that are moved up the logs from ground level on to say a truck.

This is a clumsy and heavy method which this invention has been designed to avoid, the object being to simplify loading and unloading of goods by mechanised means over an inclined runway formed of channel or other irons and adapted to be moved on wheels. On the runway is a trolley that is hauled over the irons by a winch and means are provided for facilitating the loading and discharge of the freight; for applying the brake to the trolley and for preparing the same for a descent over the ramp by gravity.

The ramp is preferably constructed with the runway of channel irons that at the bottom and the top of the ramp merge towards the horizontal. During a haul, the trolley will ride on the irons in such a way that its front wheels will move under the top flanges of the irons while the rear wheels wil run upon the top of the same. By such arrangements the floor or platform of the trolley can be kept substantially horizontal while climbing the runway, but when it arrives at the top its floor will be canted forwardly and downwardly to facilitate discharge of the load.

The lower end of the ramp is horizontal where the trolley is at rest to receive a load and with the trolley platform horizontal. When the haul begins the front trolley wheels will commence to move on to and over the incline of the ramp causing the centre of gravity of the load to alter. This will throw the loading backwards to cause the front wheels of the trolley to leave the lower flanges of the irons and to thereafter run over the under surfaces of the upper flanges. As the haul proceeds, the rear wheels of the trolley will come on to the upper surfaces of the flanges over which the trolley will move. While each set of carrying wheels is climbing the ramp the trolley platform will be substantially horizontal except for the slight backward cant. This position of the platform can remain constant throughout the haul irrespective of the inclination of the ramp which may vary according to circumstances. This can be assured by the arrangement of the trolley wheels with respect to the ramp incline. Thus, in the design herein to be described the drawing will indicate a ramp with an inclination of about 30 degrees, but if the inclination be say 60 degrees a trolley will be used having the distance between its wheel centers reduced, the front and rear wheel sets being therefore placed closer together.

Channel irons are suggested for strength but for loading of the lighter kind two plain strips or ribbons of say inch steel may be employed in parallel to form the ramp when the rear wheels of the trolley will run on the top surfaces of same while the front wheels will engage and move over the under surfaces. The ramp is mounted in a stout framework that is wheel borne.

We have elected to describe our invention in this specification and the drawing with a ramp formed of channel irons in parallel with the flanges extending inwards. These and other useful features of the structure will now be described with reference to the accompanying drawing in which—

Figure 1:
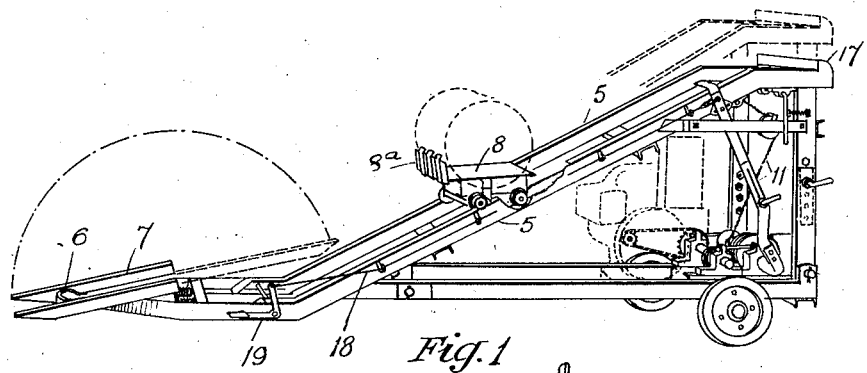
Fig. 1 shows the ramp in perspective with a load proceeding over same.
Figure 2:
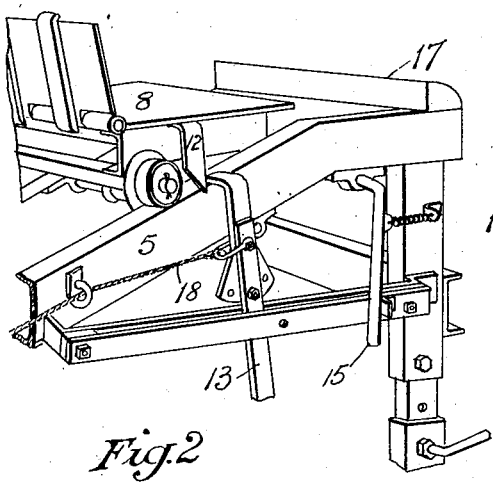
Fig. 2 is like view, but enlarged, showing the trolley approaching the top.

Upon a stout framework a ramp of channel irons 5 with inwardly extending flanges, is erected in parallel, to form the runway which inclines upwardly from ground level at a required angle. The forward end of the framework under the upper end of the ramp is adapted to be extended vertically, as indicated in Fig. 1, to adjust the ramp at the delivery end as required.

Figure 4:
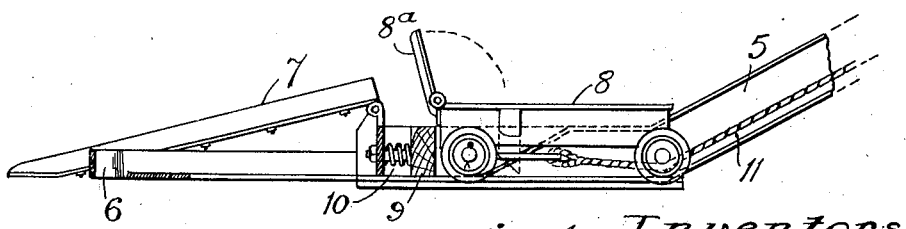
Fig. 4 is side elevation of the lower end of ramp and its connections with the trolley while awaiting loading and shown partly in section.

At the lower end of the ramp the irons are adapted to extend horizontally and to converge to a towing draw bar and eye device 6 which is used for transporting the ramp, that is wheelborne, from place to place. At the said lower end is a small inclined ramp 7, that during towing can be folded over the trolley 8 on a hinge (Fig. 4), while the trolley is provided with a back stop 8a, spring controlled to keep it normally erect.

The trolley 8 is accommodated on the horizontal floor of the ramp when not being used and will rest against the stop bar 9 and buffer springs 10 with both wheel sets on the level of the lower flange of the irons. In this position it is ready for loading, the freight being rolled or otherwise moved over member 7 and the spring controlled stop 8a on to the trolley which will be held in position during loading between said bar and at the front close against the foot of the ramp while the loading on the trolley may rest against the stop 8a that will have resumed its erect position.

Figure 3:
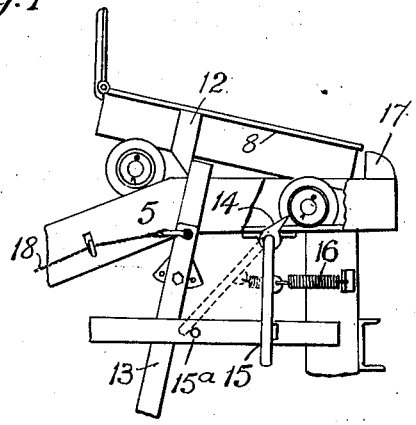
Fig. 3 illustrates in side elevation a sectional fragment of the ramp with the trolley in position for discharging the load.

The trolley is hauled upwards by a motor operating a winch over the drum of which a haulage rope 11 extends to pass under the front axle of trolley to be fastened to a convenient part such as its rear axle; on the trolley is a tappet plate 12 so disposed as to engage at the ramp top lever 13 pivotally mounted on the said framework. The inclination of the ramp at the top is reduced as the front wheels of the trolley approach the top a trip pawl 14 will be engaged by a trolley wheel; the pawl is part of a lever 15 that will be rocked to extend a tension spring 16. A front wheel will roll over the pawl to rock lever which will immediately react under the spring 16 to cause the pawl to come behind the wheel, thus retaining the trolley in position for delivering the load which, if a drum, will readily leave same by gravity. Thus, while the trolley floor or platform during movement up the ramp is maintained substantially horizontal it will, at the top, assume the inclined position of Fig. 3, while the rear wheels of the trolley are still on the inclined part of the runway. At the same time the tappet 12 will engage lever 13 and the latter will be moved to cause the drum clutch to be disengaged and if further swung it may be used to operate a brake on the drum. The trolley is prevented from overrunning the ramp by the block 17 over which the load will be delivered.

The lever 13 is connected above its fulcrum to a cord or the like 18 that is led along the ramp structure to a bell-crank lever 19, preferably foot operated, and so arranged that when rocked the lever 13 will release the winch brake to permit the trolley to start by gravity on its return journey. Before so doing, the front wheel must be freed from the pawl 14 by swinging over, by hand, the lever 15 and holding same by a pin 15a. The motor and friction winch mechanism and its connections with lever 13 are of ordinary well known type and no claim thereto is made, per se.

It will thus be observed that the ramp merges at the lower and upper ends towards the horizontal while the trolley wheels are disposed to travel thereover as specified. When the trolley arrives at the lower end of the ramp it will assume the horizontal position. This is made possible by downwardly inclining the upper horizontal flanges of the irons from near where the ramp merges into the horizontal (Fig. 4), over which the rear wheels of the trolley will pass to the lower member thus leaving the lower flanges as bearing surfaces to all the wheels of the trolley while at rest.

At the top of the ramp the reduction of the angle of inclination will begin at a point slightly in advance of the trolley rear wheels with the trolley at rest (Fig. 3); this will ensure that as it stops with a load to deliver its floor shall incline forwardly and downwardly with the wheels in position to permit of ready removal of the loading and to facilitate the return of the trolley by gravity.

It will be possible to operate the device with a single attendant who, having swung the pawl 14 and lever 15 away by hand and having loaded the trolley, will press the foot lever 19 to rock lever 13, to throw in the motor. The load will then be hauled to the top when the lever 13 will be engaged by the tappet 12 to throw out motor and apply winch brake thereby bringing trolley to rest in the position indicated in Figure 3.

The load having been delivered, in a self acting way if it be a cylinder such as an oil drum, the attendant will again press foot lever 19 to cause lever 13 to be rocked to disengage the winch brake, when the trolley will be free to descend the ramp by gravity for further loading. Thus, movements of the trolley up and down the ramp can be made with great ease and celerity.

The pawl 14 and lever 15 are provided for additional security in retaining the trolley for unloading at the ramp top. It may be used alone for light loading and instead of employing the winch braking means, but if said braking means is used to hold the trolley while unloading the pawl and lever 15 are to be swung away out of action.

Having now described our invention what we claim as new and desire to secure by Letters Patent is:

1. A ramp, a stout framework on wheels the forward vertical part of said framework being capable of extension or retraction vertically, inclined channel irons the flanges of which extend inwardly on the framework to form the haulage surface or runway that at the bottom and top merges towards the horizontal, a trolley moving over the runway, the inclined and lower horizontal portions of the channel irons being arranged to maintain the floor of the trolley substantially horizontal while at rest and during the upward movement, the trolley being inclined forwardly and downwardly at the top of the ramp.

2. A ramp composed of channel irons the flanges of which extend inwardly supported in a stout framework and wherein the haulage runway merges at the bottom and the top towards the horizontal, a trolley the wheels of which run over the upper and lower surfaces of the flanges which remains substantially horizontal while at rest at the bottom of the ramp and during its upward movement, a minor ramp behind the trolley, a spring controlled back stop on the trolley that is normally erect but over which loading to the trolley can pass from the minor ramp.

3. A ramp composed of angle irons supported in a stout framework and wherein the haulage runway merges at the bottom and top towards the horizontal, a trolley moving thereover the floor of which remains substantially horizontal while at rest and during its upward movement, a spring controlled back stop on the trolley that is normally erect, a minor ramp hingeably attached to the framework immediately behind the trolley while at the lower end of the ramp and means for hauling the trolley over the ramp and for controlling the haul.

4. A ramp composed of channel irons having inwardly extending flanges in a stout framework on wheels and wherein the haulage runway merges at the bottom and the top towards the horizontal, a trolley the wheels of which run over the upper and lower surfaces of the flanges which remains substantially horizontal at the bottom of the ramp and during its upward movement, the upper flanges of the irons near the bottom end being inclined downwardly and over which the rear wheels of the trolley will pass as the trolley comes to rest to receive a load.

5. A loading ramp comprising a wheel mounted framework, parallel track members each including upper and lower track surfaces, the medial portions of the track surfaces of each track member being inclined and the upper and lower portions thereof extending horizontally, the upper horizontal portions and the inclined portions of the track surfaces of each track member being vertically spaced and the lower portions of said track surfaces lying in the same horizontal plane, a trolley including front wheels movable along the lower track surfaces and rear wheels movable along the upper track surfaces whereby the trolley is maintained in horizontal position when the wheels engage the lower horizontal portions of the track surfaces and when the wheels engage the inclined portions of said track surfaces, the trolley assuming a tilted discharge position when said wheels engage the upper horizontal portions of said track surfaces.

CHARLES F. J. SMITH.
LEONARD R. BOTTOM.